C. A. McGEE.

Corset.

No. 9,496. Reissued Dec. 7, 1880.

Witnesses:
N. A. Low.
J. S. Barker.

Inventor:
Charlotte A. McGee
by H. H. Dowsleday
Atty

N. PETERS, PHOTO-LITHOGRAPHER, WASHINGTON, D. C.

UNITED STATES PATENT OFFICE.

CHARLOTTE A. McGEE, OF JACKSON, MICHIGAN.

CORSET.

SPECIFICATION forming part of Reissued Letters Patent No. 9,496, dated December 7, 1880.

Original No. 194,045, dated August 14, 1877. Application for reissue filed February 27, 1880.

*To all whom it may concern:*

Be it known that I, CHARLOTTE A. McGEE, of Jackson, in the county of Jackson and State of Michigan, have invented certain new and useful Improvements in Corsets; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

The object I have in view is to construct the body of a corset, to which may be applied a skirt-supporter and shoulder-straps, so that the corset can be worn with greater ease, and will make a better fit than heretofore; and one part of my invention consists in cutting the front and back pieces with the fabric, and providing these pieces with bones, and cutting the side pieces to the corset-body on the bias, the whole being secured together in the ordinary or any convenient manner. Other features of the invention will be explained.

Figure 1:
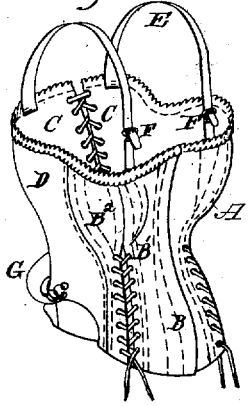
Figure 2:
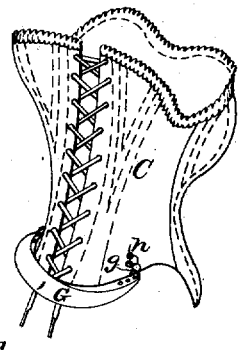
Figure 3:
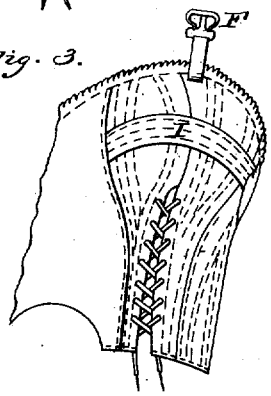
Figure 4:
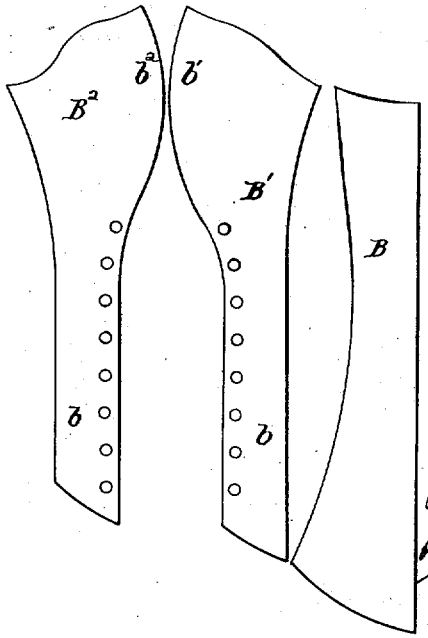

Figure 1 is a perspective view of my corset. Fig. 2 is a perspective from the rear, with skirt-supporting roll attached thereto. Fig. 3 is a perspective from the inside of one of the busts. Fig. 4 is a detached view, enlarged, of the pieces of which the front parts are composed.

In the drawings, A represents the body of a corset, in which the fronts and backs are cut with the fabric, and in such shape that when they are stitched together the required shape or flare of the bust is obtained.

The front is composed of two parts, each of which consists of three pieces, B $B'$ $B^2$. As shown in Fig. 4, the piece B is practically straight upon one edge, but is curved upon the other. The pieces $B'$ $B^2$ are concave upon their outer edges. Their lower portions, $b$, are of substantially uniform width, the upper ends being largely expanded, as at $b'$ $b^2$, in such manner that when their curved adjacent edges are united they will give the proper contour to the bust of the corset.

The front and the back C are cut with the fabric, and are constructed to receive whalebones or steels in substantially the same manner as are ordinary corsets.

The lower adjacent edges of the pieces $B'$ $B^2$ are provided with eyelets to receive laces, as shown, the edges of the upper portions of these pieces being sewed firmly together, their shape being such as to insure the requisite form without the necessity of putting in gores.

The hip or side pieces, D, of the corset are cut to a true bias of the cloth, which allows it to stretch and conform itself to the form of the wearer, and, as it fits snugly to the person, the usual "hip-bones" are dispensed with, which are used in the ordinary corset for the mere purpose of giving form.

By cutting the front and back pieces with the fabric no gores are required to give the proper form to the bust portions, and these pieces being provided with bones, as usual, the desired shape to the corset is obtained, and the necessary support given to the wearer, while by cutting the side pieces on the bias, and leaving them without bones, a better and closer fit is secured, and greater freedom and ease in movement allowed to the wearer.

This manner of constructing the body of a corset produces a light and convenient article of wear, and one which can be manufactured cheaper than those ordinarily made.

E are shoulder-straps secured to the back pieces of the corset, their lengths being regulated by the buckles F, as may be desired.

G represents a skirt-supporting roll, which is adjustable upon the corset, at the back, by means of the rings $g$ and eyelets $h$.

The busts of the corsets are held in an expanded position by the bands I, which consist of one or more bound bones, the ends of the bands being sewed into the seams at each side of the bust.

It will be seen that the swells or expansions $b'$ $b^2$ project about equally from lines prolonged from the edge $b$, and that the lines of lacing, being the lines of junction of the edges $b$, form prolongations of the median lines of the bust portion of each side of the corset. Therefore the tightening or loosening of the lacings will not materially alter the fit of the bust, as such operation would if the lines of lacing were located elsewhere.

What I claim is—

1. The body of corset having the front and back pieces cut with the fabric and provided with bones, and the side pieces, D, cut on the bias, substantially as set forth.

2. A corset-front having two pieces, $B'$ $B^2$, united firmly at their upper ends on the median line of the bust, open at their lower ends, and adapted to be laced on the lines formed by the prolongation of said median line of the bust, substantially as set forth.

In testimony that I claim the foregoing I have hereunto set my hand this 20th day of February, 1880.

CHARLOTTE A. McGEE.

Witnesses:

N. C. LOWE,

MELVILLE McGEE.